Nov. 8, 1927.  
R. LEE  
1,648,000  
VARIABLE SPEED TRANSMISSION  
Filed May 28, 1924

WITNESSES  
George Mueller  
M. E. Downey

INVENTOR.  
Royal Lee,  
By R. S. Caldwell  
ATTORNEY.

Patented Nov. 8, 1927.

1,648,000

UNITED STATES PATENT OFFICE.

ROYAL LEE, OF MILWAUKEE, WISCONSIN, ASSIGNOR TO LEE ENGINEERING RESEARCH CORPORATION, OF MILWAUKEE, WISCONSIN, A CORPORATION OF WISCONSIN.

VARIABLE-SPEED TRANSMISSION.

Application filed May 28, 1924. Serial No. 716,424.

The invention relates to variable-speed transmissions.

An object of the invention is to provide a variable-speed transmission having a continuously variable-speed changing means in which a speed ratio of unity is obtained by a direct drive, thus affording a high mean efficiency.

Another object of the invention is to provide a variable-speed transmission in which the torque at speeds other than direct is transmitted partly by the variable-speed means, and partly by direct passage from the driving member, thus promoting the efficiency at such speeds.

A further object of the invention is to provide a variable-speed transmission in which variable motion produced by the mechanism is used to neutralize or offset the motion applied, the variation of such first-named motion causing the driven member to assume various speeds, any speed of which is equal to the applied speed minus the speed produced.

A further object of the invention is to provide a variable-speed hydraulic transmission in which pressure relief devices on the valve means permit effective closure of the ports without the generation of destructive pressures during the closure period and without leakage between high and low pressure spaces during partial closure of ports.

The invention further consists in the several features hereinafter set forth and more particularly defined by claims at the conclusion hereof.

In the drawings: Fig. 1 is a longitudinal sectional view of a variable-speed transmission embodying the invention;

Figure 1:
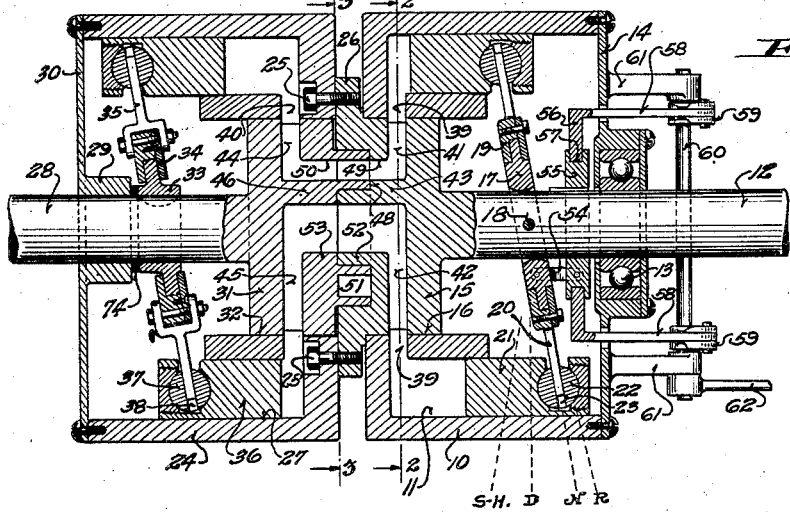
Figure 2:
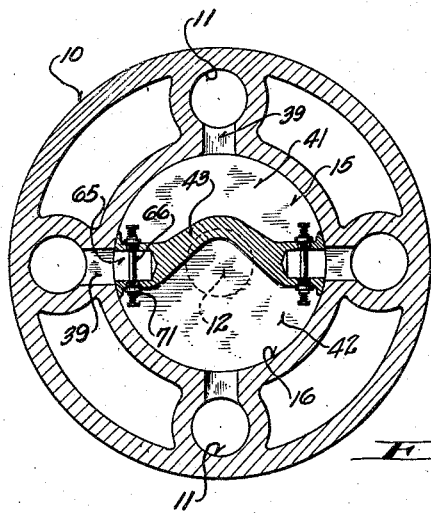
Fig. 2 is a transverse sectional view taken on the line 2—2 of Fig. 1.
Figure 3:
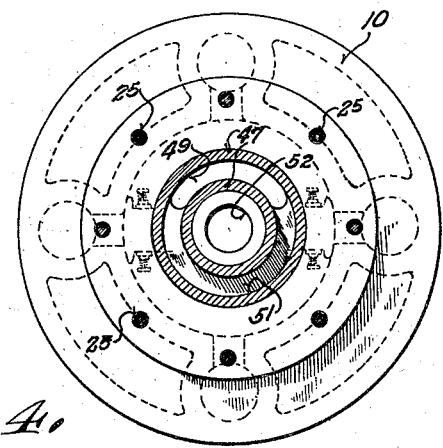
Fig. 3 is a transverse sectional view taken on the line 3—3 of Fig. 1.
Figure 4:
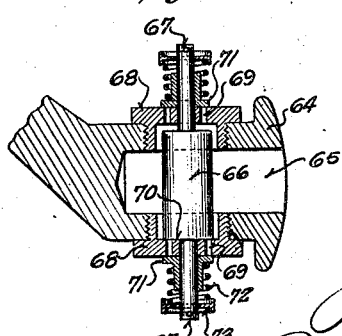
Fig. 4 is a detail sectional view of a selective relief valve.

In the drawings 10 designates a stationary cylinder barrel provided with a series of equally spaced parallel cylinder bores 11 disposed symmetrically about its axis and extending parallel thereto.

A driving shaft 12 is journalled in an anti-friction bearing 13 supported on a plate 14 secured to one end of the cylinder barrel and an enlarged end portion 15 of the shaft is journalled in a bore 16 in the other end of the barrel.

A swash-plate 17 is pivotally secured to the shaft 12 by a pin 18 and is rotatably mounted within an annular ring 19 provided with radially extending arms 20 operatively connected to pistons 21 slidably mounted in the cylinder bores 11, spherical members 22 being seated in the pistons and provided with transversely extending slots 23 to receive the arms 20, which are slidable therein. A floating connection is thus formed between the annular ring 19 and the pistons 21.

A rotating cylinder barrel 24, substantially identical with the stationary cylinder barrel 10, is secured by bolts 25 to a flange 26 on the enlarged end of the shaft 12 and is provided with a series of equally-spaced cylinder bores 27 equal in number to those on the stationary cylinder barrel.

A driven shaft 28 is journalled in a hub 29 on a plate 30 secured to the end of the cylinder barrel 24, and an enlarged end portion 31 of the shaft is journalled in a bore 32 in the other end of the barrel.

A swash-plate 33 is secured to the shaft 28 and is rotatably mounted within an annular ring 34 provided with radially extending arms 35 operatively connected to pistons 36 slidably mounted in the cylinder bores 27, spherical members 37 being seated in the pistons and provided with transversely extending slots 38 to receive the arms 35, which are slidable therein.

The stationary cylinder barrel 10 is provided with ports 39 extending radially from each cylinder head to the bore 16, and the rotatable cylinder barrel 24 is provided with similar ports 40 extending radially to the bore 32.

The enlarged end portion 15 of the driving shaft 12 is provided with passages 41 and 42 opening to the bearing surface of the shaft in register with the ports 39 in the stationary cylinder barrel 10. The passages are separated from each other by a partition 43, the ends of which are diametrically opposite, so that the openings of each passage extend almost half-way around the bearing surface of the shaft.

The enlarged end portion 31 of the driven shaft 28 is provided with similar passages 44 and 45 opening to the bearing surface of the shaft in register with the ports 40 in the rotating cylinder barrel 24. The passages are separated from each other by a partition 46, the ends of which are diametrically opposite, so that the openings extend almost half-way around the bearing surface of the shaft.

The peripheral openings of the two passages in each shaft end are so disposed that each affords communication with all the cylinders in which the pistons are moving in the same direction.

The enlarged end portion 31 of the driven shaft 28 is provided with a pair of spaced annular ribs 47 projecting into an annular channel 48 in the end portion of the driving shaft 12. An arcuate opening 49 in the bottom of the channel 48 communicates with the passage 41 in the end of the driving shaft, and a similar opening 50 in the bottom of the channel formed between the annular ribs 48 communicates with the passage 44 in the end of the driven shaft.

The annular passage 51 between the ribs 48 forms a conduit connecting the openings 48 and 49 in any relative position of the driving and driven shafts and the passages 42 and 45 in the driving and driven shafts respectively are placed in communication by central registering openings 52 and 53 in the adjacent ends of the respective shafts.

The cylinders and communicating passages are filled with a fluid medium, preferably an oil, and to insure a completely-filled system at all times, small quantities of oil may be introduced into low-pressure spaces while the transmission is in operation.

To vary the displacement of the pistons in the stationary cylinder barrel the pivoted swash-plate 17 is connected by a link 54 to a collar 55 splined on the shaft 12 and movable to various positions by an annular ring 56 slidably seated in a peripheral groove 57 in the collar. The ring is provided with longitudinal projections 58 extending through the plate 14 and connected to levers 59 secured to a transversely extending shaft 60 journalled in brackets 61 on the plate 14 and having a control lever 62 at its end.

The stationary cylinder barrel with its pistons and other moving parts forms a neutralizing or offsetting unit of variable displacement while the corresponding parts associated with the rotating cylinder barrel forms a pump in which the displacement of each piston is fixed. Since the pump delivers oil to the variable displacement unit from one side while oil is being returned to the other side a difference of pressure exists between the delivery and return passages in the adjacent ends of the driving and driven shafts, these passages being separated by the partitions 43 and 46.

The ends of these partitions close the ports of those cylinders in which the pistons have reached the extreme ends of their movement so that upon further rotation the ports will be in communication with the proper passages in order to deliver or receive oil. The ends of the partitions must bridge the ports to prevent leakage from the high pressure to the low pressure passages, but the ports must not remain closed for more than an instant because a destructive pressure would be built up by a slight forward movement of the piston unless means are provided for relieving it. Theoretically, a valve which would barely close the ports might serve the purpose, but such a valve is difficult of attainment and would cause wire-drawing and soon develop leakage.

To obviate these difficulties, I have provided a selective relief valve which permits ample valve width for proper sealing without giving rise to the generation of destructive pressures in the cylinders. A valve surface 64, somewhat wider than the ports, is formed at the end of each partition, and an opening 65 extends radially into the partition from the central part of the valve surface. A valve member 66 extends transversely of the opening with reduced stems 67 at each end slidably mounted in caps 68 secured to opposite sides of the partition. Each of the caps is provided with a set of openings 69, one set being closed on the inside by one of the shoulders 70 on the valve member 66, and both sets on the outside by flanged valves 71 slidably mounted on the valve stems 67, the valves 71 being held down to their seats by springs 72 compressed at the outer ends in cup washers 73 secured to the outer ends of the valve stems.

Upon the rotation of the shafts 12 and 28 and at a time when the valve ports are not covered by the ends of the partition, the flanged valves 71 close the openings 69 on each side of the partition so that no leakage of oil occurs between the high and low pressure passages, but the valve member 66 is moved by the pressure of oil in the high pressure passage to close the inner ends of the openings 69 adjacent the low pressure passages.

When the end of the partition completely bridges a port any pressure developed in the isolated cylinder during the closure period will be relieved through the openings 69 communicating with the high pressure passage, the spring-pressed flanged valve 71 being forced outwardly by the pressure and the openings communicating with the low pressure passage being held closed on the inside by the valve member 66.

During a partial closure of a port a by-pass leakage from the high pressure passage is prevented because the valve member closes the inner ends of the openings 69 communicating with the low pressure passage.

The longitudinal thrust exerted between the ends of the shafts by the oil pressure in the passages is taken by a thrust washer 74 interposed between the hub 29 of the plate 30 and the swash-plate 33.

In the transmission of this invention speed changes are produced by neutralizing or offsetting a relatively fixed applied motion by a variable motion. In the illustrated embodiment of the invention the applied motion is that in the rotating unit and the variable motion that in the stationary unit.

In operation, when the pivoted swash-plate of the variable displacement unit is in a plane normal to the axis of the shaft, as indicated in Fig. 1 by the dotted line "D", there is no displacement of the pistons and consequently the pistons in the rotating cylinder barrel cannot move relatively thereto, since there is no outlet for the oil. Accordingly the driven shaft is effectively locked to the rotating cylinder barrel which is in turn secured directly to the driving shaft, thereby affording a direct drive in which no movement of oil takes place and having a high efficiency comparable with that of the usual gear transmission.

A neutral condition is obtained by setting the pivoted swash-plate at the full line "N" position of Fig. 1, in which the piston displacement in the stationary cylinder barrel is equal to that of the rotating cylinder barrel. In this position the displacement of the pistons in the stationary cylinder barrel affords an outlet for all the oil displaceable by the pistons in the rotating cylinder barrel so that no reaction is present to cause movement of the driven shaft. The oil then circulates idly between the cylinder barrels.

For intermediate speeds the displacement of the pistons in the stationary cylinder barrels is lessened to furnish a reaction causing rotation of the driven shaft at a speed corresponding to the difference in displacement of the two sets of pistons.

It will be seen that the torque at intermediate speeds is transmitted partly by direct passage from the driving member and partly by the variable speed means, so that a high efficiency is obtained, approaching that of direct drive as the speed ratio approaches unity.

To obtain a reverse rotation of the driven shaft the piston displacement of the stationary cylinder barrel is increased over that of the rotating cylinder barrel by increasing the angle of the pivoted swash-plate beyond neutral, as indicated by the dotted line "R" in Fig. 1. The variable displacement unit then acts as a pump delivering oil to the fixed displacement unit in excess of its normal fixed displacement, the latter unit then acting as a motor to cause rotation of the driven shaft in the reverse direction.

A speed ratio above unity, which may be termed a step-up or "super-high", is obtained by setting the pivoted swash-plate at an angle indicated by the dotted line "S—H" of Fig. 1. The oil then displaced by the pistons 21 is delivered to the rotating cylinder barrel to produce relative movement of the pistons 26, thereby causing the driven shaft to assume a speed above that of the rotating cylinder barrel, which is secured to the driving shaft.

For all speeds ranging from reverse through neutral to direct drive the two component motions occur in the same relative direction, while for speeds above direct, the variable motion occurs in the opposite direction. In all cases, however, the resulting motion at the driven shaft corresponds to the algebraic difference between the motions produced, the variable motion being subtracted from the applied motion.

The speed range from reverse through neutral and direct to "super-high" is obtained by a simple progressive movement of the control lever, the changes in speed being continuously variable and the speed changing mechanism beginning to function as the speed ratio is varied in either direction from the direct drive.

There is no appreciable reaction on the control lever so that it is very easily moved to any of its operative positions, which may be accomplished by automatic control, if desired.

Instead of using the variable stroke method for the control of pump output to effect speed changes, the selective relief valves permit the use of another method of control which consists generally in an angular displacement of the valve ports with respect to the swash-plate, thus accomplishing the same result with a lesser expenditure of effort. The construction affording such operation is more particularly shown in my co-pending application for hydraulic transmissions, Serial No. 43,280; filed July 13, 1925.

The moving parts of the mechanism are small in number and are of simple character, and the oil passages between relatively moving members are formed by concentric cylindrical fits which permit of precision in manufacture.

Since the fluid displacement is produced during the relative rotation of a cylinder barrel and the shaft to which it is operatively connected, it will be apparent that modifications may be made in which either of these members is the driving member, the operation of the mechanism being substantially the same.

The transmission of this invention is particularly adapted for use in internal combustion engine-propelled automobile vehicles wherein its simplicity, ease of control, and high efficiency are desirable characteristics.

What I claim as new and desire to secure by Letters Patent is:

1. In a variable speed transmission, the combination of a pair of relatively rotatable co-axial cylinder barrels disposed end to end and having their adjacent ends provided with cylinder ports extending to central openings therein, rotatable shaft means journalled in said openings and provided with valve passages adapted to register with said ports for placing said cylinder barrels in communication, means for producing fluid displacement in said cylinder barrels during the relative rotation of each barrel and the shaft means journalled therein, the fluid displaced in one of said cylinder barrels being directed through said passages to the other cylinder barrel, and means for varying the displacement in one of said cylinder barrels to vary the relative rotation of the other cylinder barrel and shaft means.

2. In a variable-speed transmission, the combination of a pair of relatively rotatable coaxial cylinder barrels disposed in tandem relation and having their adjacent ends provided with cylinder ports extending to central bores therein, a pair of shaft members having their adjacent ends journalled in said bores and each provided with a pair of passages adapted to register with said ports and to form a conduit between said cylinder barrels, means for producing fluid displacement in said cylinder barrels during the relative rotation of each barrel and the shaft member journalled therein, the fluid displaced in one of said cylinder barrels being directed through said passages to the other cylinder barrel, and means for varying the displacement in one of said cylinder barrels to vary the relative rotation of the other cylinder barrel and shaft member.

3. In a hydraulic transmission, the combination of a port-closing member separating high and low pressure fluid spaces and having a recess adapted to register with a port, valve means placing said recess in communication with said high and low pressure spaces and operable upon a predetermined pressure in the port to relieve said pressure, and valve means operable by the pressure in the high pressure space for closing communication from said recess to the low pressure space.

4. In a hydraulic transmission, the combination of a port-closing member separating high and low pressure fluid spaces and having a recess adapted to register with a port, spring-pressed valves normally closing relief passages in said member between said recess and said spaces and operable upon a predetermined pressure in said port to relieve said pressure, and a valve member disposed in said recess and operable by the pressure in the high pressure space for closing the relief passage extending to the low pressure space.

5. In a hydraulic transmission, the combination of a port-closing member separating high and low pressure fluid spaces and having a recess adapted to register with a port, spring-pressed valves normally closing relief passages in said member between said recess and said spaces and operable upon a predetermined pressure in said port to relieve said pressure, and a valve member disposed in said recess and having ends extending slidably through said member to said pressure spaces, said valve member being adapted to close the relief passage extending to the low pressure space by pressure exerted on the end of the valve member in the high pressure space.

In testimony whereof, I affix my signature.

ROYAL LEE.